United States Patent [19]
Wong et al.

[11] Patent Number: 5,113,099
[45] Date of Patent: May 12, 1992

[54] ROTARY ACTUATOR FOR MAGNETIC RECORDING

[75] Inventors: King L. Wong, Cupertino; Frank Morris, San Jose, both of Calif.

[73] Assignee: Maxtor Corporation, San Jose, Calif.

[21] Appl. No.: 730,633

[22] Filed: Jul. 16, 1991

[51] Int. Cl.⁵ .............................. H02K 41/00
[52] U.S. Cl. ...................... 310/13; 310/12; 369/219
[58] Field of Search ............... 310/12, 13, 190, 192, 310/15, 19; 369/215, 219, 225, 249; 335/279, 280, 281

[56] References Cited

U.S. PATENT DOCUMENTS

| | | | |
|---|---|---|---|
| 3,296,472 | 1/1967 | Fisher | 310/186 |
| 4,652,779 | 3/1987 | Wilcox | 310/13 |
| 4,864,170 | 9/1989 | Eguchi | 310/12 |
| 5,057,723 | 10/1991 | Umehara et al. | 310/12 |

Primary Examiner—Steven L. Stephan
Assistant Examiner—Judson H. Jones
Attorney, Agent, or Firm—Blakely, Sokoloff, Taylor & Zafman

[57] ABSTRACT

An improved actuator support structure includes a centerpole member having an opening or void disposed at a middle region. The opening improves the rise time of the actuator without diminishing the flux density within the centerpole member. Additional openings are disposed in the centerpole member along opposite sides of the first opening. These additional openings are calculated to optimize the flux density within the centerpole member by slightly restricting the area of the centerpole where the magnetic flux flows.

15 Claims, 3 Drawing Sheets

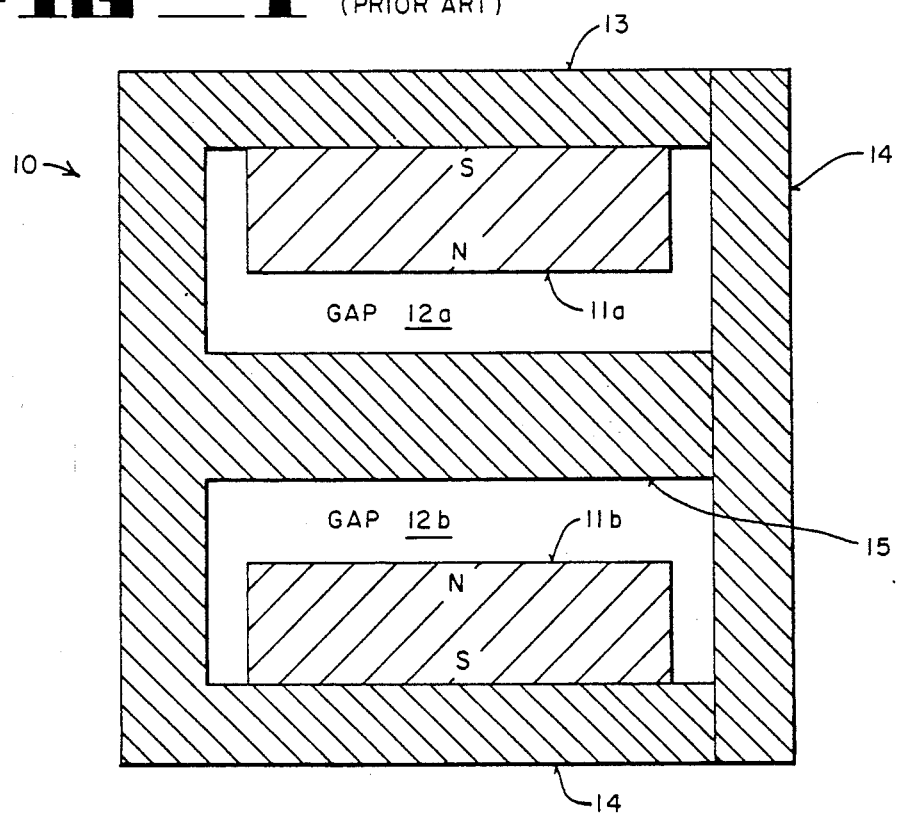
FIG_1 (PRIOR ART)
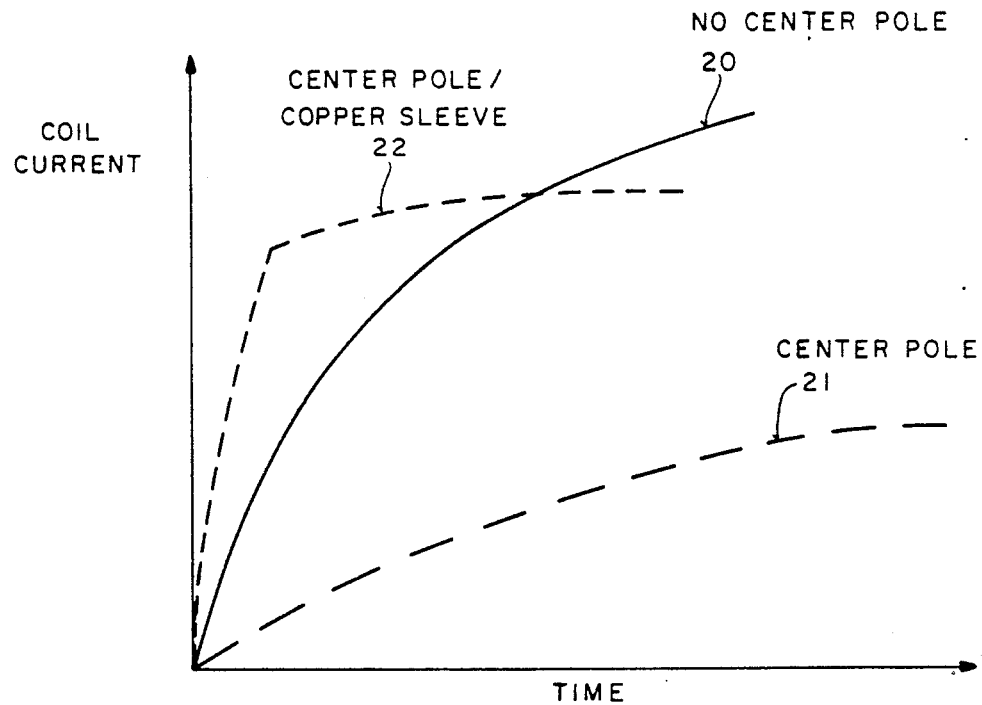
FIG_2 (PRIOR ART)

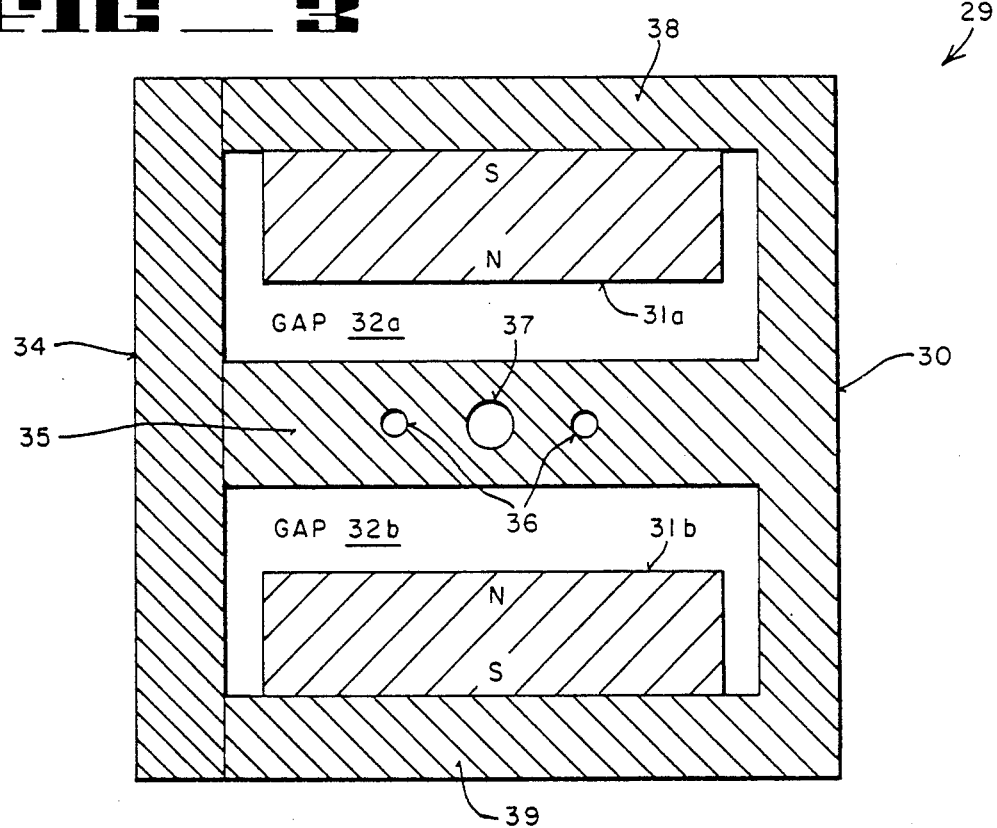
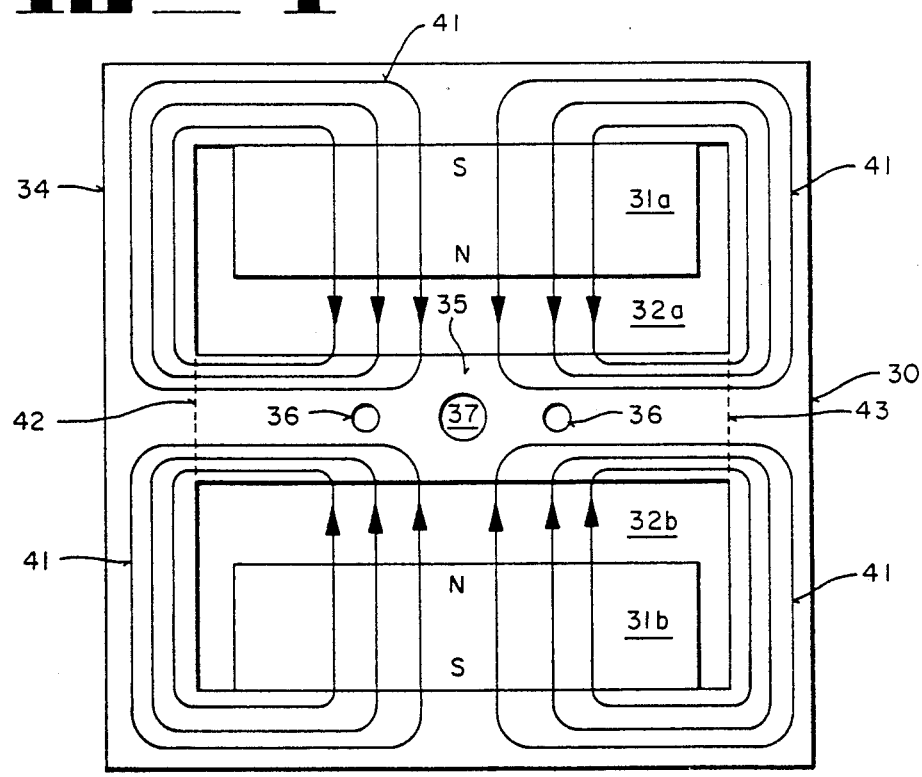

FIG_5
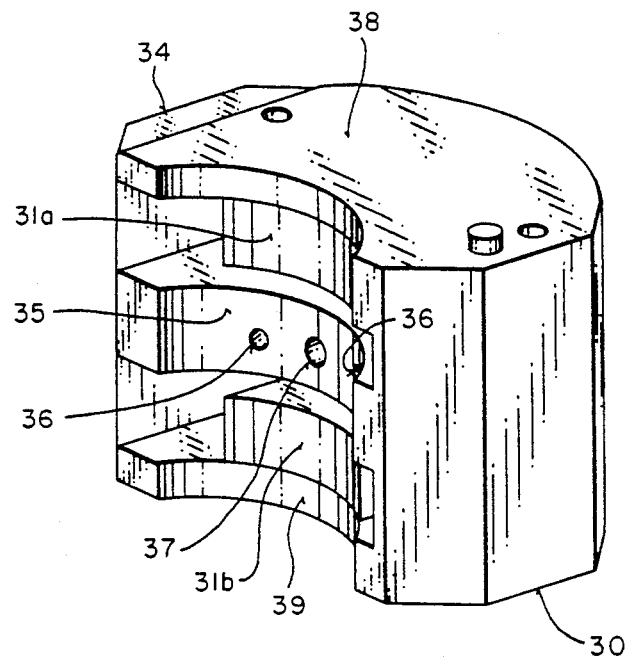
FIG_6
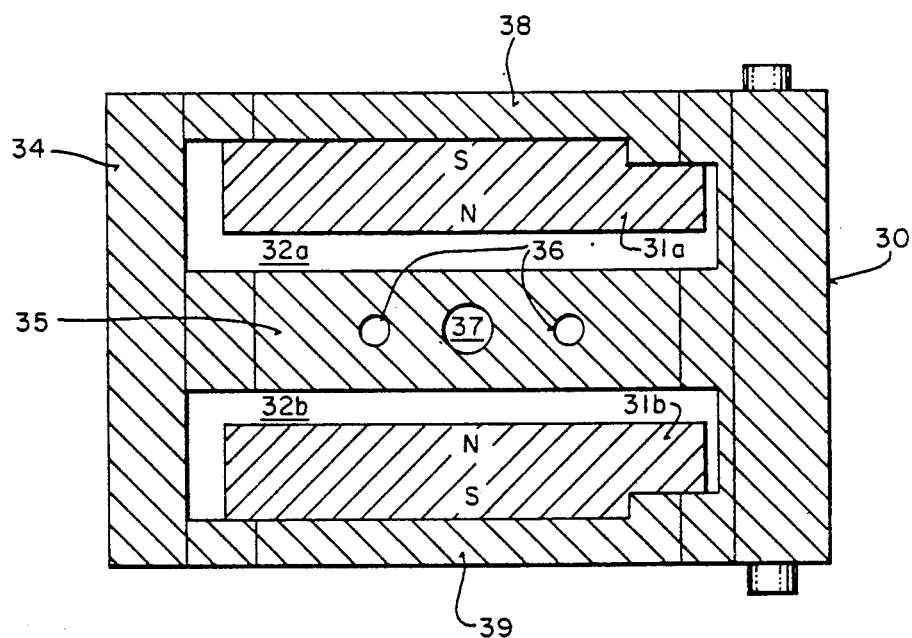

ROTARY ACTUATOR FOR MAGNETIC RECORDING

FIELD OF THE INVENTION

The present invention relates to the field of magnetic recording systems; particularly to the design of rotary actuators for use in computer disk drive storage devices.

BACKGROUND OF THE INVENTION

Rotary actuators are driven by voice/coil motors (VCMs) in which electrical impulses are translated into movement of transducers or head elements. This type of actuator has found wide usage in modern disk drive recording systems. Typically, the VCMs operate in conjunction with servo control systems to position the servo and read/write head elements radially over the spinning magnetic disk.

VCM type actuators consist of a permanent magnetic structure and a moveable coil or bobbin attached to a comb of arms carrying the read/write heads. The coil is positioned either between or around a pair of permanent magnets which are housed within a steel structure. FIG. 1 illustrates a cross-section of a typical prior art actuator structure. Steel support structure 10 is used for energizing the coils attached to the actuator arm assembly. Structure 10 includes respective upper and lower poles 13 and 14 and centerpole 15. Magnets 11a and 11b are shown attached to plates 13 and 14, respectively, within support structure 10. These magnets are suitably polarized (i.e., north pole directed towards centerpole 15) so as to develop magnetic lines of flux which extend across air gaps 12a and 12b. The moveable coil is wrapped around centerpole 15 through gaps 12a and 12b.

According to the principles of physics, passing a current through a coil placed in a magnetic field results in a force upon the coil which can then be translated into a movement of the servo and read/write heads about a pivot axis. Movement of the heads is controlled by means of ordinary servo-control techniques which position the heads directly over various tracks of the magnetic recording medium, i.e., the rotating magnetic disk.

As is appreciated by practitioners in the field, one of the key performance parameters for disk files is access time; that is, the time it takes the heads to move from one track to another in response to coil current. Access time is directly related to the response time of the coil (i.e., the rise time or time constant) to an applied current.

FIG. 2 shows a plot of coil current versus response time for various prior art actuator designs. In each of these plots, the coil current rises an exponential function of time. Generally, for optimal performance it is desired to have a response curve such as that depicted by line 20 in FIG. 2. Line 20 represents the coil response for the structure of FIG. 1 with centerpole 15 removed. In other words, line 20 represents the response of a coil wrapped in air, as opposed to one wrapped around a steel centerpole member. While the response curve for a support structure without a centerpole (i.e., air) is desirable for optimal access times, it suffers from the drawback of very low flux density.

Without centerpole 15, the flux density across gap 12a and 12b is substantially lowered. This translates into a lower torque constant for the actuator and a bigger variation in magnetic air gap density. So in effect, in the absence of centerpole 15, a fast rise time can be realized, but at the expense of a lower, non-linear torque constant. For this reason, virtually all of the support structures employed in disk drive systems include some kind of a centerpole member.

As stated above, incorporating a centerpole into structure 10 greatly increases the flux density. However, because of the self-magnetization effect wherein the field strength in the center region is dependent upon the permeability there; the response of an actuator having a centerpole is generally greatly diminished. Such a condition is shown by dashed line 21 in the plot of FIG. 2. Effectively, the presence of centerpole 15 increases the inductance of the coil, thereby slowing the coil's ability to move in response to an applied current.

In an attempt to circumvent this problem, the prior art wrapped a copper conductor around centerpole 15, either in a one piece extrusion or as multiple pieces soldered together. This type of actuator is commonly referred to as a shorted copper turn. Normally the shorted turn was stationary. The purpose of the shorted turn was to lower the effective inductance and to decrease the effective time constant so that a quicker current response could be achieved. However, this type of design is also prone to certain problems.

One of the drawbacks of the shorted copper turn design is the fact that the steel-to-magnet gap must be increased to accommodate the additional copper material. This increase in the steel-to-magnet gap lowers the torque available per unit of coil current. Another more fundamental problem, is the fact that the shorted copper turn provides a response time which is excessively fast—actually jerking the actuator so hard as to generate a very high rate of change of acceleration, and thus generate mechanical resonances within the system. Moreover, the shorted copper turn approach tends to complicate the design of the control loop servo tracking mechanism since the response curve for the shorted copper turn design includes two to three time constants.

Dashed line 22 of FIG. 2 illustrates a typical response for a centerpole design with a shorted copper turn. As is clearly seen, the response of this type of structure is governed by two distinct time constraints.

Yet another prior art approach provided for the incorporation of a copper bar directly into centerpole 15. This approach is exemplified in U.S. Pat. No. 4,652,779. Although this design does not require an increase in the steel to magnetic gap, it is not without its drawbacks. As discussed earlier, the use of copper decreases the response time beyond the point of optimization such that mechanical resonances and vibrations are frequently generated within the system. Furthermore, the cost of the copper material and the associated labor cost for consolidating the copper bar into the centerpole is excessive for certain designs. The accumulated manufacturing tolerances are also high due to the copper thickness and the epoxy glue typically used to bond the parts together. Also, nickel plating is sometimes required to protect the copper surface from corrosion. Thus, designs which employ a copper bar integrated into the centerpole are often costly and require complex manufacturing.

What is needed then is a actuator support structure which provides a response curve which approaches the ideal of a moving coil in air. But at the same time the support structure should provide a relatively high flux density to maintain a linear torque constant. As will be seen, the present invention provides a solution to this problem by means of optimally sized and spaced openings disposed in the centerpole of the support structure. For reasons which will be explained in more detail shortly, the present invention provides improved access times with higher flux densities when compared with prior art designs.

SUMMARY OF THE INVENTION

An improved actuator support structure for translating electrical impulses into rotational movement of a coil about a pivot point is disclosed. In one embodiment, the actuator includes a frame having upper and lower structural members orthogonally attached to left and right side members. The frame also has a centerpole member joined to the left and right side members between the upper and lower members.

Upper and lower permanent magnets are attached to the upper and lower structural members, respectively. These magnets are suitably polarized and oriented within the frame so that permanent magnetic flux flows in a path from said magnets, through the centerpole member, and back again to to the magnets through the frame. The coil is situated around the centerpole member between the upper and lower magnets.

The improvement comprises a first opening disposed substantially at the midpoint of the centerpole member, approximately half-way between the left and right side members. The opening decreases the response time of the actuator without diminishing the flux density within the centerpole member.

In another embodiment, second and third openings are disposed in the centerpole member along opposite sides of the first opening. The size, shape and location of the second and third openings is calculated to optimize the flux density within the centerpole member by slightly restricting the area of the centerpole where the magnetic flux flows.

BRIEF DESCRIPTION OF THE DRAWINGS

The novel features believed characteristic to the invention are set forth in the appended claims. The invention itself, however, as well as other features and advantages thereof, will be best understood by reference to the detailed description that follows, read in conjunction with the accompanying drawings, wherein:

FIG. 1 is a cross-sectional elevation view of a prior art actuator support structure.

FIG. 2 is a plot of the current versus time response curves for several prior art actuator designs.

FIG. 3 is a cross-sectional elevation view of the present invention.

FIG. 4 illustrates the conductive path for the magnetic flux lines throughout the support structure in accordance with the present invention.

FIG. 5 is a perspective view of the currently preferred embodiment of the present invention.

FIG. 6 is a cross-sectional elevation view of the support structure shown in FIG. 5.

DETAILED DESCRIPTION

An improved rotary actuator for use in computer disk drive systems is described. In the following description, numerous specific details are set forth, such as specific material types, thicknesses, dimensions, etc., in order to provide a thorough understanding of the invention. It will be obvious, however, to one skilled in the art that these specific details need not be used to practice the present invention. In other instances, other well-known structures and processing steps have not been described in particular detail in order to avoid unnecessarily obscuring the present invention.

Referring to FIG. 3, a cross-sectional elevation view of the presently invented support structure 29 is shown. Support structure 29 comprises a body 30 and an endplate 34, both of which are preferably machined out of a low carbon steel. (Pure iron may also be used, but is expensive and often difficult to obtain.) Body 30 comprises upper and lower support members 38 and 39, respectively, and a centerpole 35. Attached to upper support member 38 is magnet 31a. Magnet 31b is similarly attached to lower support member 39. Both magnets 31a and 31b are suitably polarized so that flux is directed from the magnet into centerpole 35 (i.e., the north pole of both magnets is closest to centerpole 35). The coil (now shown in FIG. 3) is wrapped around centerpole 35 through gaps 32a and 32b. During the manufacturing process, endplate 34 is attached to body 30 after the coil is positioned within gaps 32a and 32b. As is appreciated by practitioners in the field, endplate 34 provides a return path for the flux lines through the left half of support structure 29.

The salient feature of the present invention is the existence of holes 37 and 36, which preferably extend through the entire width of centerpole 35. The purpose of hole or openings 37 is to reduce the volume in centerpole 35 without reducing the flux density therein. This is accomplished by providing a space directly in the center of centerpole 35—equidistant from the sides where centerpole 35 attaches to endplate 34 and body 30.

The reason why opening 37 does not result in loss of flux density has to do with the nature of the flux distribution throughout support structure 29. This flux distribution is illustrated in FIG. 4 by lines 41. As can be seen, lines 41 emanate from magnets 31a and 31b, pass across gaps 32a and 32b, and return to their respective magnets through the steel structure comprising body 30, support members 38 and 39, and endplate 34. Even in the absence of opening 37, no flux passes through the middle of centerpole 35. In other words, all of the magnetic flux lines are diverted to paths which do not traverse this middle region. Since there is little or no flux passing through the middle of centerpole 35, reducing the volume of steel in this region has virtually no effect on the flux density.

On the other hand, the presence of opening 37 provides definite benefits. Replacing steel with air in the middle of centerpole 35 raises the response curve for the actuator. Recall in connection with the discussion of FIG. 2 that the ideal response is realized with no centerpole member (i.e., air), but that such a structure is unfeasible because of the consequent loss of flux density. The present invention achieves a response which is close to this ideal by means of opening 37, and at the same time maintains a high measure of flux density.

Note that this result is achieved by locating opening 37 directly in the middle of centerpole 35. Thus, opening 37 is shown in FIGS. 3 and 4 being positioned an equal distance from either end of centerpole 35, as represented by dashed lines 42 and 43. It should be further appreciated that the shape, size and extent of opening 37 may vary in different embodiments. For instance, opening 37 may assume an oval or diamond shape in some cases, or have a larger or smaller dimension depending on such factors as the strength of the magnets, type of materials used, sizes and dimensions of centerpole 35, etc. Still, other embodiments may choose to implement opening 37 as a hidden void within the center of centerpole 35. Each of these alternatives is considered to be well within the spirit and scope of the present invention.

Openings 36 are calculated to serve an entirely different purpose than opening 37. While opening 37 is aimed at reducing the volume in the centerpole material without adversely impacting flux density, openings 36 are included to optimize the flux density by reducing the area in centerpole 35 in the regions where magnetic flux flows. This area reduction is calculated to increase the flux density to an optimum level such that the centerpole is heavily, magnetically saturated. With the centerpole optimally saturated, its magnetic characteristics approach that of air. In other words, optimizing the flux density throughout the centerpole 35 makes the response curve for support structure 29 move even closer to that of the ideal (i.e., an air centerpole). Thus, the purpose of openings 36 is to make the cross-sectional area within centerpole 35 slightly smaller. Careful selection of the size and placement of openings 36 results in an optimum magnetic saturation of centerpole 35. This optimization of flux density within centerpole 35 is depicted in FIG. 4 by the closer spacing of lines 41 in the area of centerpole 35, as compared with the flux density throughout the remainder of the magnetic flux path.

In accordance with the currently preferred embodiment of the present invention, the size, shape, number and location of openings 36 are calculated analytically to optimize the amount of saturation in centerpole 35 using a computer program. The program is designed to calculate the flux density in various regions of the support structure. At present, two different analytical programs have been employed for this purpose. The first program is called "Magneto" and is a two-dimensional program which employs boundary element techniques to solve a set of non-linear equations describing the flux behavior. A second program, known as "Ampere", is a three-dimensional magnetics package. Both programs are commercially-available from Integrated Engineering Services, Inc. of Winnepeg, Canada. Obviously, optimization of openings 36 depends upon a multitude of factors, such as the energy product of the magnet, the size and number of turns of the coil, the cross-sectional area of the centerpole and the support members, the permeance of the support structure material, and the size, shape, number and location of openings 36.

It should be mentioned that certain restrictions exist with respect to the specification of openings 36. For example, if numerous holes 36 were disposed generally across the length of center pole member 35, flux density would actually be diminished or throttled due to the greatly reduced area. What is desired is to reach an optimum point where the flux density across gaps 32a and 32b is optimized by magnetically saturating centerpole 35 to further improve the coils response time.

Another feature of the present invention is the utilization of magnets 31a and 31b. In accordance with the currently preferred embodiment, these magnets are selected to have an extremely high energy product. Because the magnet also determines the amount of flux across gaps 32a and 32b, employing a high energy product magnetic allows for a larger remanent magnetization. This translates into a larger amount of flux lines emanating from the magnet with a corresponding increase in flux density. Preferably, magnets 31a and 31b comprise a neodymium-iron-boron (NdFeB) material having the highest energy product (35 $MGO_e$ or greater) currently available in a commercial magnet. Theoretical and experimental results show that the combination of energy product and the magnet thickness play a role in the optimization process.

FIGS. 5 and 6 illustrate two different views of the currently preferred support structure of the present invention. In the preferred embodiment, the thickness of centerpole 35 is approximately 0.246 inches with opening 37 being approximately 0.108 inches in diameter. Openings 36 are disposed approximately 0.2 inches from the middle of centerpole 35; each opening 36 having a diameter of approximately 0.078 inches. The upper and lower poles are approximately 0.09 inches thick with the overall height of the support structure being approximately 0.982 inches. The thickness of magnets 31a and 31b is approximately 0.200 inches.

We claim:

1. A centerpole member mounted along the radial line of movement of a moveable coil within a rotary actuator assembly, comprising a piece of solid material highly conductive to magnetic flux, said member having a centrally-located void which increases the response time of said actuator without significantly reducing the flux density within said member.

2. The centerpole of claim 1 wherein said member includes at least one pair of secondary voids disposed laterally about said centrally-located void.

3. The centerpole of claim 2 wherein each of said secondary voids is spaced equidistant from said centrally-located void.

4. The centerpole of claim 3 wherein the size, shape and location of said secondary voids is calculated to optimize the flux density within said centerpole member.

5. The centerpole of claim 4 wherein said material comprises steel.

6. A rotary actuator support structure for housing a moveable coil having a centerpole member mounted along the radial line of movement of said coil, said centerpole member comprising a material permeant to magnetic flux and having a central opening disposed substantially in the the middle of said member, said central opening increasing the response time of said actuator without significantly reducing the flux density within said member.

7. The support structure of claim 6 further comprising at least one pair of additional openings in said centerpole member disposed laterally about said central opening, said additional openings being calculated to optimize the flux density within said centerpole member.

8. The support structure of claim 7 wherein said material comprises steel.

9. An improved actuator for translating electrical impulses into radial movement of a coil about a pivot point, said actuator including a frame having upper and lower structural members orthogonally attached to left and right side members, said frame also having a centerpole member joined to said left and right side members between said upper and lower members;

said actuator further including upper and lower permanent magnets fixedly attached to said upper and lower members, respectively, said magnets being suitably polarized and oriented within said frame so that permanent magnetic flux flows in a path from said magnets, through said centerpole member, and back to said magnets through said side members and said respective upper and lower members;

said coil being situated around said centerpole member between said upper and lower magnets, and wherein the improvement comprises:

a first opening disposed substantially at the mid-point of said centerpole member approximately half-way between said left and said right side members, said opening increasing the response time of said actuator without significantly reducing the flux density within said centerpole member.

10. The improvement of claim 9 further comprising second and third openings disposed in said centerpole member along opposite sides of said first opening.

11. The improvement of claim 10 wherein the size, shape and location of said second and third openings is calculated to optimize the flux density within said centerpole member.

12. The improvement of claim 11 wherein said frame comprises steel.

13. The improvement of claim 12 wherein said upper and lower magnets comprise a neodymium-iron-boron alloy material having a high energy product.

14. The centerpole of claim 3 wherein said centrally located and secondary voids extends through the entire width of said member.

15. The support structure of claim 7 wherein said central opening and said additional openings extend through the entire width of said member.

* * * * *